UNITED STATES PATENT OFFICE.

RICHARD JUDSON DOYLE, OF OWEN SOUND, CANADA.

NON-INFLAMMABLE CEMENT.

SPECIFICATION forming part of Letters Patent No. 490,548, dated January 24, 1893.

Application filed July 20, 1892. Serial No. 440,603. (No specimens.)

*To all whom it may concern:*

Be it known that I, RICHARD JUDSON DOYLE, a resident of Owen Sound, in the county of Grey and Province of Ontario, Canada, have invented certain new and useful Improvements in Non-Inflammable Cement; and I do hereby declare the following to be a full, clear, and exact description of the invention, such as will enable others skilled in the art to which it pertains to make and use the same.

The object of the invention is to produce a non-inflammable cement, and it consists, essentially, in a mixture of vinegar, lime water, salt, alum, white vitriol, linseed or other drying oils, crude petroleum and fat or unctuous clay in the proportions hereinafter fully described.

In order to produce my fire-proof cement, proceed as follows: Mix the vinegar and lime water in equal parts, and in order that these two elements may be thoroughly combined keep the solution in a warm place for three days or longer and stir it frequently. Then add to one gallon of the said mixture one half pound of salt, one quarter pound of alum, and one quarter pound of white vitriol, each in the form of a powder. The above solution is then heated to its boiling point. Stir it continuously until the salt, alum and white vitriol are dissolved. Then add to one gallon of the above compound one gallon of linseed oil, or other drying oil, and again heat it to its boiling point and stir and agitate it while heating. Then add to two parts of this compound one part of crude petroleum and again heat it to its boiling point and thoroughly stir while heating. Then mix with this compound a sufficient quantity of dry, ground, soft unctuous clay containing from twenty five to eighty per cent of silicate of alumina to bring the compound to the consistency of molasses at a temperature of 70° Fahrenheit. The shades of color are varied by any well known pigments in general use for painting purposes. For light color the petroleum is omitted.

Having thus described my invention, what I claim is:

1. The hereinbefore described composition of matter, forming a non-inflammable cement consisting of a mixture of vinegar, lime water, salt, alum, white vitriol, linseed or other drying oil, petroleum, and dry, ground, soft, unctuous clay containing from twenty five to eighty per cent of silicate of alumina mixed substantially in the proportions and manner set forth.

2. The hereinbefore described composition of matter, forming a non-inflammable cement consisting of a mixture of vinegar, lime water, salt, alum, white vitriol, linseed or other drying oil, and dry, ground, soft, unctuous, clay containing from twenty five to eighty per cent of silicate of alumina mixed substantially in the proportions and manner set forth.

In testimony whereof I have signed this specification in the presence of two subscribing witnesses.

RICHARD JUDSON DOYLE.

Witnesses:
S. J. HOPKINS,
MAGGIE COBEAU.